United States Patent [19]
van Ommen et al.

[11] Patent Number: 5,205,992
[45] Date of Patent: Apr. 27, 1993

[54] APPARATUS FOR INTRODUCING CATALYST PARTICLES INTO A MOVING BED OF CATALYST

[75] Inventors: Klaas van Ommen; Christian E. Brakel, both of Amsterdam, Netherlands

[73] Assignee: Shell Oil Company, Houston, Tex.

[21] Appl. No.: 701,715

[22] Filed: May 17, 1991

[30] Foreign Application Priority Data

May 22, 1990 [GB] United Kingdom ................. 9011407

[51] Int. Cl.$^5$ ........................... F27B 15/08; B01J 8/20
[52] U.S. Cl. .................................. 422/140; 422/143; 422/145; 422/214
[58] Field of Search ............... 422/214, 140, 144, 143, 422/145, 139

[56] References Cited

U.S. PATENT DOCUMENTS

| | | | |
|---|---|---|---|
| 2,606,104 | 8/1952 | Hogan et al. | 422/139 |
| 2,640,731 | 6/1953 | Hill | 302/53 |
| 2,937,988 | 5/1960 | Polack | 422/139 X |
| 4,172,193 | 9/1988 | Glatt | 422/143 X |
| 4,230,668 | 10/1980 | Sheely et al. | 422/144 X |
| 4,479,920 | 10/1984 | Dodson | 422/143 |
| 4,518,750 | 5/1985 | Govoni et al. | 422/143 X |
| 4,578,183 | 3/1986 | Chou et al. | 422/143 X |
| 4,820,493 | 4/1989 | Haddad | 422/143 |
| 4,853,189 | 8/1989 | Holland | 422/140 |
| 5,053,203 | 10/1991 | Mauleon et al. | 422/145 X |

FOREIGN PATENT DOCUMENTS

0180291A1  5/1986  European Pat. Off. .
0344032  11/1989  European Pat. Off. .
0423876A1  4/1991  European Pat. Off. .

Primary Examiner—Robert J. Warden
Assistant Examiner—Amalia Santiago

[57] ABSTRACT

A riser reactor which includes a wall extending downward to an enlarged housing at the bottom of the riser reactor, where the housing has (a) an inlet for introducing catalyst particles into the housing and includes a first fluidization device, where the length of the inlet is from two to three times the diameter of the inlet, and (b) a second fluidization device below the first fluidization device, and (c) where the housing has above the inlet a centrally arranged diamond-shaped directing structure secured to the wall, where the directing structure has a lower and upper portion and where the directing structure and the wall define a passage, where the lower portion of the directing structure and the wall defines an upwardly converging portion in the passage and where the upper portion of the directing structure and the wall define an upwardly diverging portion in the passage.

4 Claims, 3 Drawing Sheets

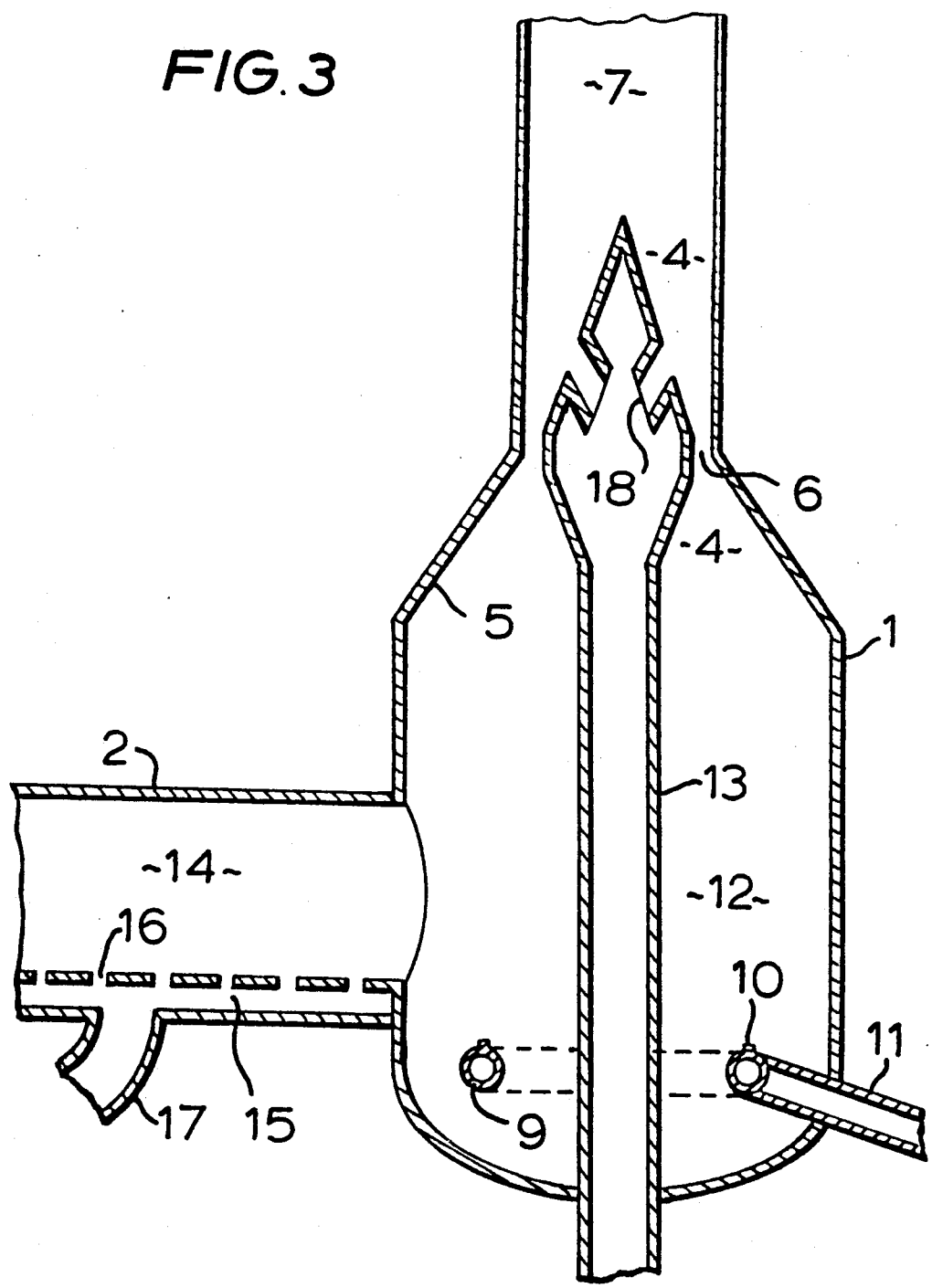

APPARATUS FOR INTRODUCING CATALYST PARTICLES INTO A MOVING BED OF CATALYST

BACKGROUND OF THE INVENTION

Field of the Invention

The present invention relates to an apparatus and a process for introducing catalyst particles into a moving bed of catalyst.

Description of the Prior Art

Prior art introduces catalyst particles into a fluid catalytic cracking reactor by means of a stand pipe interconnecting a regenerator and the bottom part of a reactor of a fluid catalytic cracking unit. A stream of catalyst particles is thus passed by gravity from the regenerator into the bottom part of the reactor (liftpot) through the stand pipe and directed to the upper part of the reactor by means of (lift)gases and the feed to be converted.

A disadvantage of the use of a conventional liftpot, however, is that the catalyst particles only obtain the flow best suited for commercial catalytic cracking (i.e. plug-flow) after they have passed the riser over a substantial length.

It has now been found that catalyst particles can advantageously be brought in plug-flow at a far earlier stage, i.e. when the riser has only been passed over a very short distance, by employing as liftpot an apparatus comprising a housing provided with a particular passage for catalyst particles in the downstream part thereof. As a result thereof improved reaction patterns can be obtained in the reactor, resulting in improved yields of valuable products.

SUMMARY OF THE INVENTION

The present invention therefore relates to an apparatus for introducing catalyst particles into a moving bed of catalyst, which apparatus comprises a housing having in the upstream part thereof inlet means for introducing catalyst particles into the housing and fluidization means, and in the downstream part thereof a passage for the catalyst particles defined between directing means and the inner wall of the housing and/or between adjacent directing means facing each other, wherein the passage has a narrowing part and a narrow part in downstream direction.

BRIEF DESCRIPTION OF THE DRAWING

In FIGS. 1-3 longitudinal sections of bottom parts of fluid catalytic cracking reactors are schematically shown.

Description of the Preferred Embodiment(s)

Figure 1:
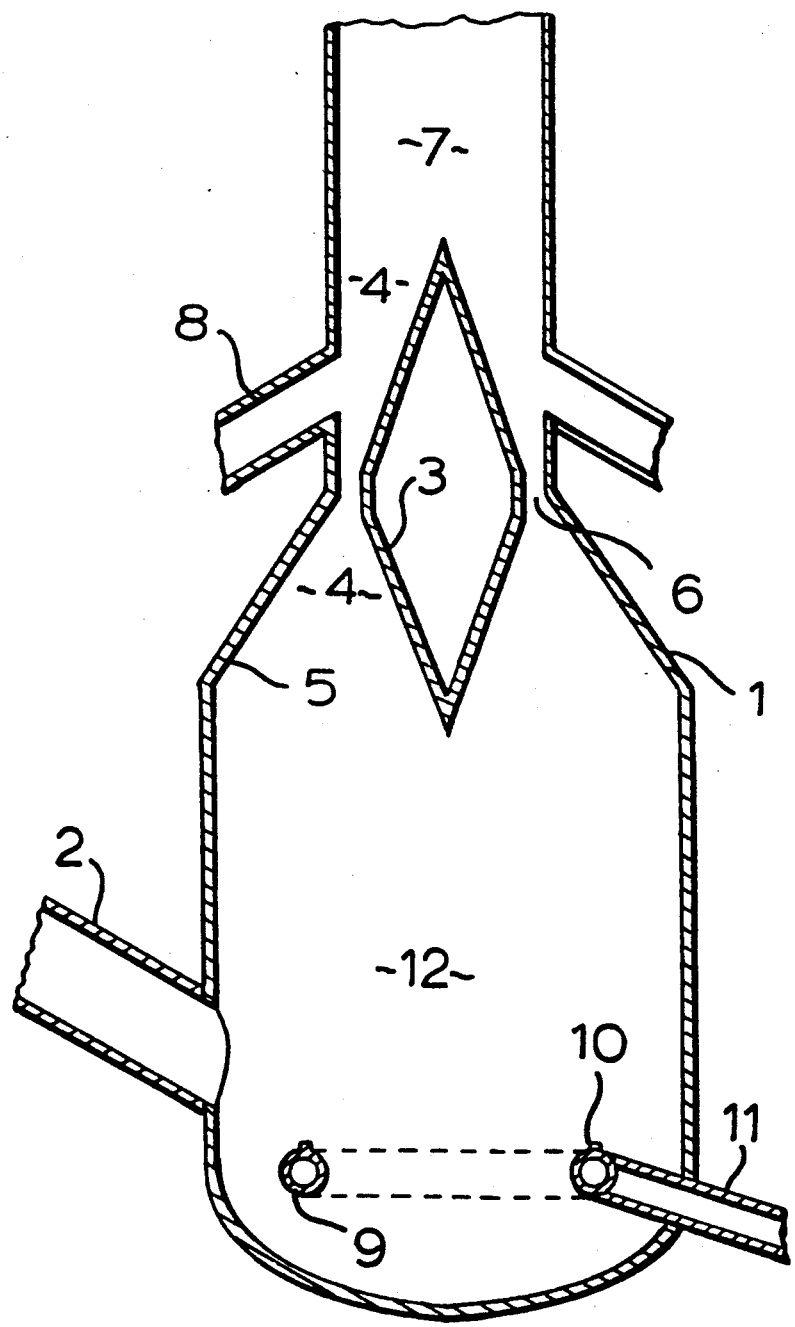

Preferably, the housing comprises a single passage defined between a substantially centrally arranged directing means and the inner wall of the housing.

Suitably, the single passage comprises an annular opening.

The annular opening is suitably uninterrupted but an interrupted annular opening comprising a series of openings arranged in an annular pattern can also be applied. Although a single (annular) passage is preferred, it should be understood that a plurality of passages can be arranged in such a way that the housing comprises more than one annular opening, for instance three annular openings to allow the catalyst particles to pass through.

Preferably, the passage of the apparatus according to the present invention comprises a widening part in downstream direction.

Suitably, the housing of the apparatus according to the present invention comprises directing means having a widening part, a wide part and a narrowing part in downstream direction.

Advantageously, the directing means has a diamond-shape vertical cross-section and is symmetrically arranged in respect to its vertical axis.

Advantageously, the apparatus according to the present invention comprises fluid supply means having at least one fluid outlet opening debouching in the widening part or at or near the narrow part of the passage.

Preferably, the fluid outlet opening is arranged downstream with respect to the narrow part of the passage.

Preferably, the fluid supply means comprises at least one device arranged onto the wall of the housing downstream with respect to the narrow part of the passage.

Advantageously, such a device comprises at least one supply means of which the wall comprises openings. The fluid to be supplied to the housing can thus be introduced into the supply means and mixed with an at least partly surrounding gas which may enter under pressure the supply means through the openings in the wall thereof.

Preferably, the apparatus according to the present invention comprises more than one device as described hereinbefore, for instance four of these devices. For further details on said devices we refer to British patent application No. 8923345.6.

Suitably, the housing comprises directing means comprising fluid supply means which extend from the bottom end part of the housing. The fluid outlet opening can suitably be arranged in the narrowing part of the directing means in downstream direction. The fluid outlet opening of the fluid supply means can be an annular opening in the downstream end part of the fluid supply means, or can be a number of openings arranged in an annular pattern in the downstream end part of the fluid supply means.

In another suitable embodiment of the apparatus according to the present invention a directing means as is arranged onto the inner wall of the housing whereby the passage is defined between said directing means and the fluid supply means extending from the bottom end part of the housing as described hereinabove.

In yet another suitable embodiment of the apparatus in accordance with the present invention the housing comprises a grid of directing means between which passages are defined having a narrowing part and a narrow part.

The apparatus according to the present invention is suitably provided with both directing means in the form of fluid supply means which extend from the bottom end part of the housing and fluid supply means in the form of devices which are arranged onto the wall of the housing having a fluid outlet opening along the widening part of the passage.

Suitably, the housing comprises a directing means in the form of a single tubular fluid supply means substantially centrally arranged in the bottom end part thereof.

Suitably, the annular passage is of such a size that the catalyst particles pass the opening at a velocity which is at least 0.25 times the velocity of the catalyst particles in the riser reactor. Preferably, the catalyst particles pass the opening at a velocity which is at least 0.5 times the velocity of the catalyst particles in the riser reactor.

In a very attractive embodiment of the present invention the apparatus comprises inlet means for introducing catalyst particles into the housing which inlet means comprises a fluidized bed of catalyst particles.

The inlet means suitably communicates with a fluidized bed of catalyst particles, for instance the bottom part of a stripper vessel or a regeneration vessel. In that way the catalyst particles are advantageously pre-accelerated before they pass the passage by using the static head at the bottom of the stripper vessel or regeneration vessel.

Preferably, the inlet means comprising the fluidized bed of catalyst particles comprises fluidization means (e.g. in the form of a perforated plate or ring-shaped or annular fluidization means) provided with regularly spaced fluidization gas openings through which a fluidization gas can be introduced in the inlet means. Suitable fluidization gases include steam and fluid catalytic cracking off gas.

The inlet means comprising the fluidized bed of catalyst particles is preferably of tubular form and horizontally arranged.

Advantageously, the inlet means of catalyst particles is arranged in such a way that the length thereof is from 2 to 3 times the diameter of the tubular inlet means, and the housing/inlet means diameter ratio is suitably in the range from 1 to 5.

Advantageously, the housing has been provided with substantially horizontally internals upstream the passage for the catalyst particles. In this way advantageously a homogeneous flow of catalyst particles is established upstream the passage of the catalyst particles.

A major advantage of the apparatus according to the present invention is that during operation a stream of catalyst particles obtains an optimal flow mode, i.e. plugflow, at a far shorter distance from the passage for the catalyst particles than conventionally is the case, resulting in improved reaction patterns in the reactor and enabling the use of shorter reactors.

The apparatus according to the present invention is advantageously used in fluid catalytic cracking operations for introducing catalyst particles in a riser reactor.

Hence, the present invention further relates to an apparatus for catalytically cracking of hydrocarbonaceous feedstocks which comprises a riser reactor the bottom end part of which is connected to an apparatus for introducing catalyst particles as described hereinbefore.

When use is made in fluid catalytic cracking of an apparatus according to the present invention wherein the fluid outlet openings for introducing a hydrocarbonaceous feedstock are arranged downstream with respect to the narrow part of the passage a rapid, intimate and uniform mixing of catalyst particles with the hydrocarbonaceous feedstock can be attained.

Suitable embodiments of the present apparatus for introducing catalyst particles in a reactor for the conversion of a hydrocarbonaceous feedstock are described hereinafter, using FIGS. 1-3 in which reference numerals relating to corresponding parts are the same.

The bottom part of the fluid catalytic cracking reactor as depicted in FIG. 1 comprises a substantially vertically housing (1) provided with an inlet means (2) for introducing catalyst particles, a directing means (3) arranged in the downstream part of the housing, a passage (4) defined between the directing means (3) and the inner wall of the housing (5) comprising an annular opening (6) and having a narrowing part, a narrow part and a widening part in downstream direction, a moving bed of catalyst (7) and fluid supply means in the form of devices (8) (of which only two have been shown) for introducing a hydrocarbon oil into the riser reactor. The riser reactor furthermore comprises fluidization means (9), for instance in the form of a ring-shaped or annular fluidization means, provided with regularly spaced fluidization gas openings (e.g. nozzles (10)) through which a fluidization gas, for instance steam, introduced via fluidization gas inlet means (11) emanates into the bottom section (12) of the reactor.

Figure 2:
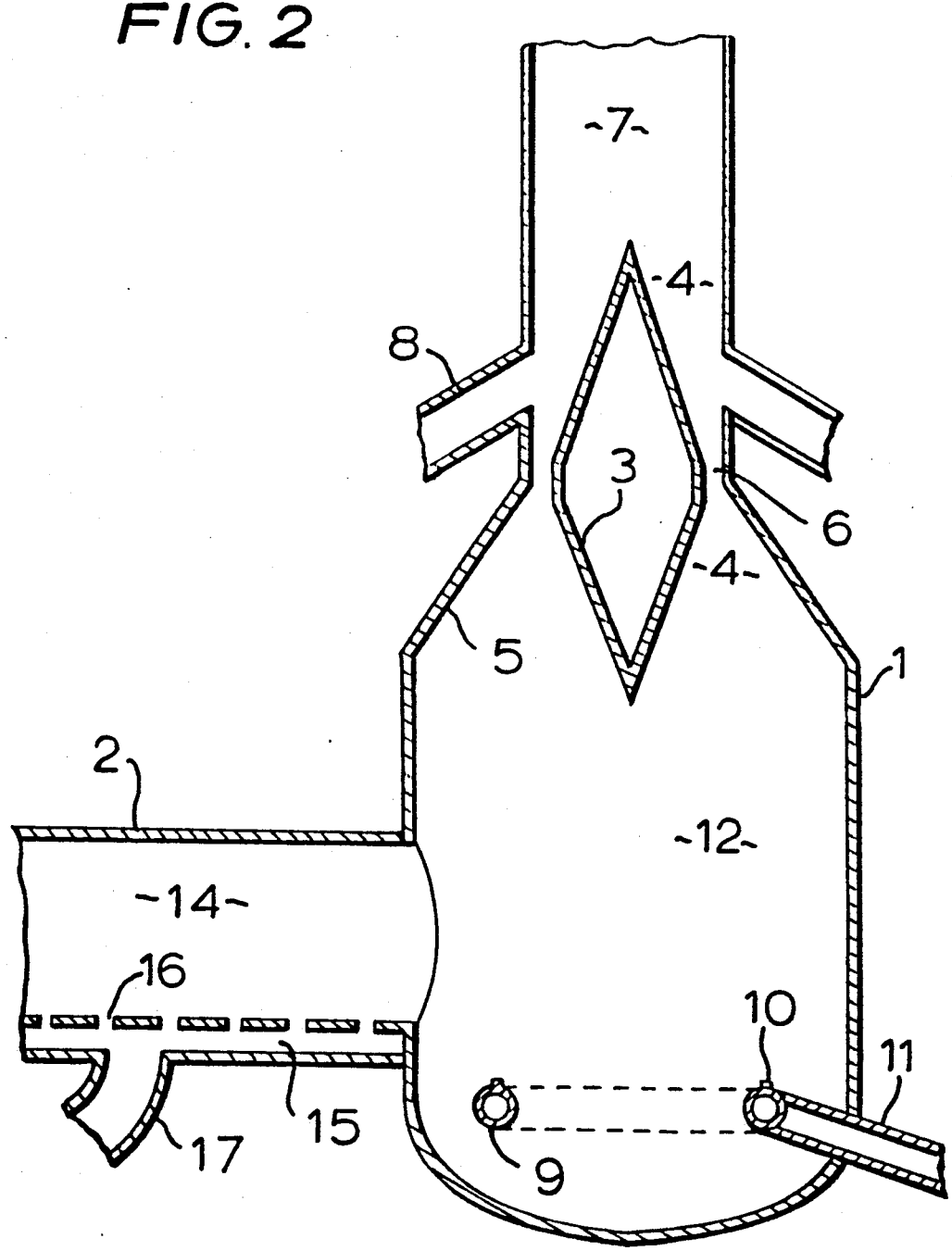

In FIG. 2 a preferred embodiment of the apparatus as depicted in FIG. 1 is shown wherein the inlet means (2) for introducing catalyst particles comprises a fluidized bed of catalyst particles (14). The inlet means (2) furthermore preferably comprises fluidization means (15) (e.g. in the form of a perforated plate as depicted in FIG. 2 or ring-shaped or annular fluidization means) provided with regularly spaced fluidization gas openings (e.g. nozzles (16)) through which a fluidization gas (e.g. steam or a fluid catalytic cracking off gas) introduced via fluidization gas inlet means (17) emanates into the fluidized bed of catalyst (14).

In FIG. 3 another suitable embodiment of the apparatus in accordance with the present invention is depicted which comprises directing means in the form of a fluid supply means (13) which extends from the bottom end part of the reactor and comprises fluid outlet openings (18) in its narrowing part (of which only two have been shown).

The invention further relates to a process for introducing catalyst particles into a moving bed, which process comprises introducing a stream of catalyst particles into the upstream part of a housing and allowing the catalyst particles to pass in downstream direction through a passage defined between directing means and the inner wall of the housing and/or between adjacent directing means facing each other, wherein the passage has a narrowing part and a narrow part in downstream direction.

Preferably, the catalyst particles are allowed to pass through a single passage which is defined between a substantially centrally arranged directing means and the inner wall of the housing.

More preferably, the catalyst particles are allowed to pass through a single passage comprising an annular opening.

In the present process suitably any of the directing means can be applied as described hereinbefore.

The apparatus used in the process according to the present invention preferably comprises a passage having a widening part in downstream direction.

Preferably, the process in accordance with the present invention is carried out in such a way that a stream of fluidized catalyst particles enters the housing. For that purpose the inlet means preferably comprises a fluidized bed of catalyst particles which communicates substantially horizontally with the bottom part of a catalyst stripper vessel or a regeneration vessel. In this way the catalyst particles are advantageously pre-accelerated before passing the passage by use of the static head at the bottom of the stripper vessel or regeneration vessel.

Preferably, a pressure drop is maintained over the passage(s) of at least 0.2 bar.

More preferably, a pressure drop is maintained over the passage(s) of at least 0.3 bar.

Suitably the stream of catalyst particles passes the opening at a velocity of at least 0.25 times the velocity which the catalyst particles have in the riser reactor.

Preferably, the catalyst particles pass the opening at a velocity of at least 0.5 times the velocity of the catalyst particles in the riser reactor.

Suitably, the fluidized stream of catalyst particles is introduced into the upstream part of housing.

Preferably, fluid is introduced downstream with respect to the narrow part, e.g. along the widening part of the passage. Thus a very attractive rapid, intimate and uniform mixing of catalyst particles with fluid is obtained.

Preferably, the fluid is introduced with respect to the narrow part of the passage by means of devices which are arranged onto the wall of the housing. The process according to the present invention can advantageously be used for introducing catalyst particles in the riser reactor of a fluid catalytic cracking unit.

Therefore, the present invention also relates to a process for catalytic cracking of a hydrocarbonaceous feedstock, wherein the feedstock is introduced into a moving bed of catalytic cracking catalyst and catalytically cracked.

Fluids such as those applied in a catalytic cracking process are preferably mixed with the catalyst particles which are passed through the passage at a temperature from 0°–800° C. most preferably from 100°–750° C.

The mixing of fluid and catalyst particles is preferably carried out at elevated pressure, most preferably from 1–100 bar abs. and in particular from 2–50 bar abs.

A fluid catalytic cracking process is preferably carried out at a temperature from 400°–800° C. and a pressure from 1–10 bar abs.

Such a process is advantageously carried out in a riser reactor for fluid catalytic cracking of a hydrocarbonaceous feedstock as referred to hereinbefore and partly depicted in FIGS. 1–3 by introducing a stream of catalyst particles originating from a catalyst regenerator by means of the present apparatus.

The catalyst/fluid weight ratio to be applied in the process according to the present invention can vary within a wide range, and may be up to 100. It will be understood that the catalyst/fluid weight ratio of the stream of catalyst particles will have an influence upon the width of the passage for the catalyst particles. The higher the catalyst/fluid weight ratio of the stream of catalyst particles introduced into the housing the larger the width of the passage for the catalyst particles.

The process according to the present invention is normally carried out as follows.

A stream of catalyst particles (e.g. originating from a catalyst regenerator) is introduced through inlet means (2) into the bottom section (12) of the riser reactor. The catalyst are transported upwardly by means of for instance steam introduced via line (11) into ring-shaped or annular fluidization means (9) provided with regularly spaced nozzles (10). The upwardly fluidized mass of catalyst particles is subsequently advantageously accelerated over the passage (4) having a narrowing part, a narrow part and a widening part in downstream direction, introduced into the moving bed of catalyst (7) and excellently mixed with the stream of hydrocarbon oil which enters under pressure with a high velocity the reactor via the devices (8) or via fluid supply means (13) through the fluid outlet openings (18).

Although hereinabove a process has been described in which a stream of catalyst particles is passed upwardly through the passage, it should be understood that in accordance with the present invention also a downwardly directed stream of catalyst particles can suitably be introduced in a moving bed of catalyst arranged downstream of the passage.

The use of the apparatus in accordance with the present invention results in a very uniform mixing of the accelerated catalyst particles and the hydrocarbon oil and an optimal flow mode of the stream of catalyst particles at a very early stage in the riser reactor. As a result of this a very attractive increase in gasoline yield can be obtained.

The hydrocarbon oil which can suitably be converted in a fluid catalytic cracking process using the present apparatus comprises heavy hydrocarbon oils, for instance atmospheric or vacuum distillates, cycle oils and slurry oils, deasphalted oils, atmospheric and vacuum residues, thermally cracked residues, asphalts originating from various kinds of deasphalting processes, synthetic residues and hydrocarbon oils originating from hydroconversion processes, tar sands and shale oils of any source, and/or any mixture thereof.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLE

The invention will be described by the following example(s) which are provided for illustrative purposes and are not to be construed as limiting the invention:

A fluid catalytic cracking experiment is carried out as follows. A stream of fluidized catalyst particles (regenerated zeolite Y catalyst particles) is introduced into a fluid catalytic cracking reactor comprising a liftpot as depicted in FIG. 2 at a temperature of 700° C. and a pressure of 3.3 bar abs., and accelerated over the passage (4). The accelerated stream of catalyst particles is subsequently mixed with a stream of hydrocarbon oil having the properties as shown in Table 1 which oil is introduced via devices (8) at a temperature of 260° C. and a pressure of 6 bar abs. The catalyst particles enter the riser reactor at a velocity of 15 m/s. The riser reactor is operated at a temperature of 520° C. and a pressure of 3 bar abs.

A comparative experiment is carried out in substantially the same manner as described hereinabove except that a fluid catalytic cracking reactor is used comprising a conventional liftpot. In the experiment which is carried out with the apparatus in accordance with the present invention. 1% wt more gasoline ($C_5$–221° C.) is obtained, when compared with the comparative experiment.

TABLE 1

| | |
|---|---|
| IBP. °C. | 273 |
| 50% w | 463° C. |
| 70% w | 506° C. |
| density 70/4 | 0.8831 |
| sulphur | 144 ppmw |
| nitrogen | 700 ppmw |

What is claimed is:

1. A riser reactor comprising a wall extending downwardly to an enlarged housing at the bottom of said riser reactor, said housing having
   (a) inlet means for introducing catalyst particles into the housing comprising a first fluidization means, wherein the length of the inlet means is from about two to about three times the diameter of said inlet means, and
   (b) a second fluidization means below said first fluidization means and said inlet means, and
   (c) said housing having above said first fluidization means and said inlet means a substantially centrally arranged substantially diamond-shaped directing means fixedly secured onto said wall, said directing means having a lower and upper portion and wherein said directing means and said wall define a passage, wherein the lower portion of said directing means and said wall defines an upwardly converging portion in said passage and wherein the upper portion of said directing means and said wall defines an upwardly diverging portion in said passage.

2. The apparatus according to claim 1, wherein the housing further comprises a fluid supply means having at least one fluid outlet opening positioned adjacent to said upwardly diverging portion.

3. The apparatus according to claim 1, wherein the directing means comprises fluid supply means extending from the bottom of the housing.

4. The apparatus according to claim 3, wherein the fluid supply means comprises fluid outlet openings which are circumferentially arranged in the upper portion of said directing means.

* * * * *